(12) United States Patent
Freeman et al.

(10) Patent No.: US 7,952,834 B2
(45) Date of Patent: May 31, 2011

(54) FLEX CIRCUIT ASSEMBLY WITH THERMAL ENERGY DISSIPATION

(75) Inventors: Rick Pfahl Freeman, Northfield, MN (US); Andrew R. Motzko, Delano, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 726 days.

(21) Appl. No.: 12/035,707

(22) Filed: Feb. 22, 2008

(65) Prior Publication Data

US 2009/0213542 A1    Aug. 27, 2009

(51) Int. Cl.
*G11B 5/48* (2006.01)
*G11B 21/16* (2006.01)

(52) U.S. Cl. ............... 360/244.1; 360/97.02; 360/245.9; 360/264.2

(58) Field of Classification Search ............... 360/244.1, 360/97.02, 245.9, 264.2, 266.3; 361/767
See application file for complete search history.

(56) References Cited

U.S. PATENT DOCUMENTS

| | | | |
|---|---|---|---|
| 3,369,267 A | 2/1968 | Friedland et al. |
| 3,490,448 A | 1/1970 | Grubb |
| 3,703,739 A | 11/1972 | Young et al. |
| 4,470,641 A | 9/1984 | Swarthout |
| 5,136,471 A | 8/1992 | Inasaka |
| 5,217,919 A | 6/1993 | Gaul et al. |
| 5,242,433 A | 9/1993 | Smith et al. |
| 5,366,589 A | 11/1994 | Chang |
| 5,397,733 A | 3/1995 | Jang |
| 5,445,311 A | 8/1995 | Trask et al. |
| 5,455,455 A | 10/1995 | Badchi |
| 5,460,620 A | 10/1995 | Smith et al. |
| 5,517,756 A | 5/1996 | Shirai et al. |
| 5,547,906 A | 8/1996 | Badchi |
| 5,594,234 A | 1/1997 | Carter, Jr. et al. |
| 5,747,377 A | 5/1998 | Wu |
| 5,875,102 A | 2/1999 | Barrow |
| 6,001,707 A | 12/1999 | Lin et al. |
| 6,078,477 A | 6/2000 | Adams et al. |
| 6,084,312 A | 7/2000 | Lee |
| 6,114,752 A | 9/2000 | Huang et al. |
| 6,117,707 A | 9/2000 | Badchi |
| 6,218,281 B1 | 4/2001 | Watanabe et al. |
| 6,258,679 B1 | 7/2001 | Burns et al. |
| 6,265,317 B1 | 7/2001 | Chiu et al. |
| 6,380,048 B1 | 4/2002 | Boon et al. |
| 6,396,129 B1 | 5/2002 | Hung et al. |
| 6,401,765 B1 | 6/2002 | Carter, Jr. et al. |

(Continued)

FOREIGN PATENT DOCUMENTS

JP    2000311324 A    * 11/2000

*Primary Examiner* — William J Klimowicz
(74) *Attorney, Agent, or Firm* — Fellers, Snider, et al.

(57) ABSTRACT

In accordance with various embodiments, a printed structure of a flex circuit assembly includes a plurality of adjacent land portions formed on a heat conductive stiffener member and which support electrically conductive paths for connection to an integrated circuit. A corresponding plurality of separation channels are formed between the adjacent electrically conductive paths, and thermal energy generated by operation of the integrated circuit is transferred through the separation channels to the stiffener member. In some embodiments, the separation channels retain a fluid, such as air or a low density inert gas, which flows through the separation channels in response to rotation of a rotatable member adjacent the flex circuit assembly. In other embodiments, a dielectric, thermally conductive material fills the separation channels.

20 Claims, 3 Drawing Sheets

U.S. PATENT DOCUMENTS

| | | |
|---|---|---|
| 6,455,355 B1 | 9/2002 | Lin et al. |
| 6,602,775 B1 | 8/2003 | Chen et al. |
| 6,808,798 B2 | 10/2004 | Tobita |
| 6,992,864 B2 * | 1/2006 | Kaneko et al. ............. 360/264.2 |
| 7,015,591 B2 | 3/2006 | Lee |
| 7,098,533 B2 | 8/2006 | Lee et al. |
| 7,154,750 B2 | 12/2006 | Li et al. |
| 7,177,147 B2 | 2/2007 | Su |
| 7,208,191 B2 | 4/2007 | Freedman |
| 2003/0099065 A1 * | 5/2003 | Watanabe .................. 360/244.1 |
| 2003/0141103 A1 | 7/2003 | Ng et al. |
| 2008/0186623 A1 * | 8/2008 | Cayaban et al. ........... 360/97.02 |
| 2009/0294165 A1 | 12/2009 | Thomas |

* cited by examiner

FLEX CIRCUIT ASSEMBLY WITH THERMAL ENERGY DISSIPATION

BACKGROUND

Data storage devices are used in a variety of applications to store and retrieve user data. In such devices the user data are often stored on internal storage media in a housing that is sealed to isolate the media from potentially deleterious contamination from an external atmosphere.

The data storage media can be one of a variety of forms, such as rotatable discs accessed by a data transducer array supported by a moveable actuator, such as found in hard disk drives. In such drives, a sophisticated preamplifier and write driver chip is positioned in close proximity to the read write heads, usually on the actuator, for signal integrity purposes.

The enclosed environment, and the insulation qualities of a flexible circuit that supports the preamplifier, can present difficulties with regard to the efficient dissipation of thermal energy generated during operation of the device.

SUMMARY

In accordance with various embodiments, a flex circuit assembly printed structure includes a plurality of adjacent land portions supported by a stiffener member to provide electrically conductive paths for connection to an integrated circuit. A corresponding plurality of separation channels are formed between the adjacent land portions, and thermal energy generated by operation of the integrated circuit is transferred through the separation channels to the stiffener member.

In some embodiments, the separation channels retain a fluid, such as air or a low density inert gas, which flows through the separation channels in response to rotation of a rotatable member adjacent the flex circuit assembly. In other embodiments, a dielectric, thermally conductive material fills the separation channels.

DETAILED DESCRIPTION

Figure 1:
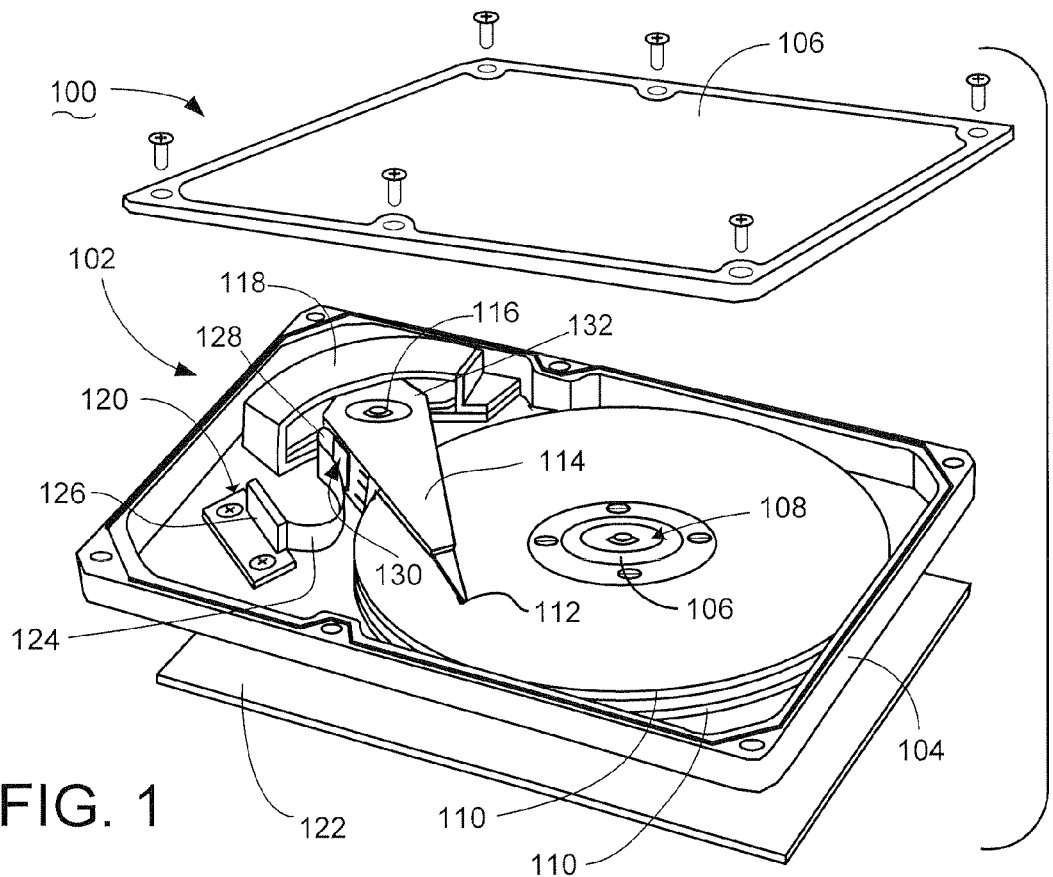
FIG. 1 is an exploded isometric view of a data storage device of the type for which the present invention is applicable.

Various embodiments of the present invention are generally directed to thermal dissipation, such as in, but not limited to, the environment of a data storage device. FIG. 1 generally illustrates a data storage device 100 that provides an exemplary environment in which various embodiments of the present invention can be advantageously practiced.

The device 100 includes a housing 102 formed from a base deck 104 to which a top cover 106 is attached and sealed to provide a closed environment. An internally disposed spindle motor 108 supports and rotates a number of storage media 110 in a selected rotational direction. An array of read/write transducers (heads) 112 access data tracks defined on the media surfaces to transfer data between the media 110 and a host device.

An actuator 114 rotates about a shaft 116 by application of current to a voice coil motor (VCM) 118 to move the transducers 112 across, and in near proximity to, the media surfaces of the disks 110. A flex circuit assembly 120 provides electrical communication paths between the actuator 114 and an externally mounted printed circuit board (PCB) 122. The flex circuit assembly 120 has a flex cable 124 having one end connected to a cable stake 126 and its other end 128 connected to a printed structure 130 that is mounted to an E-block portion 132 of the actuator 114. The E-block 132 is contemplated as comprising an aluminum body having one or more arms that support the read/write transducers 112.

Figure 2:
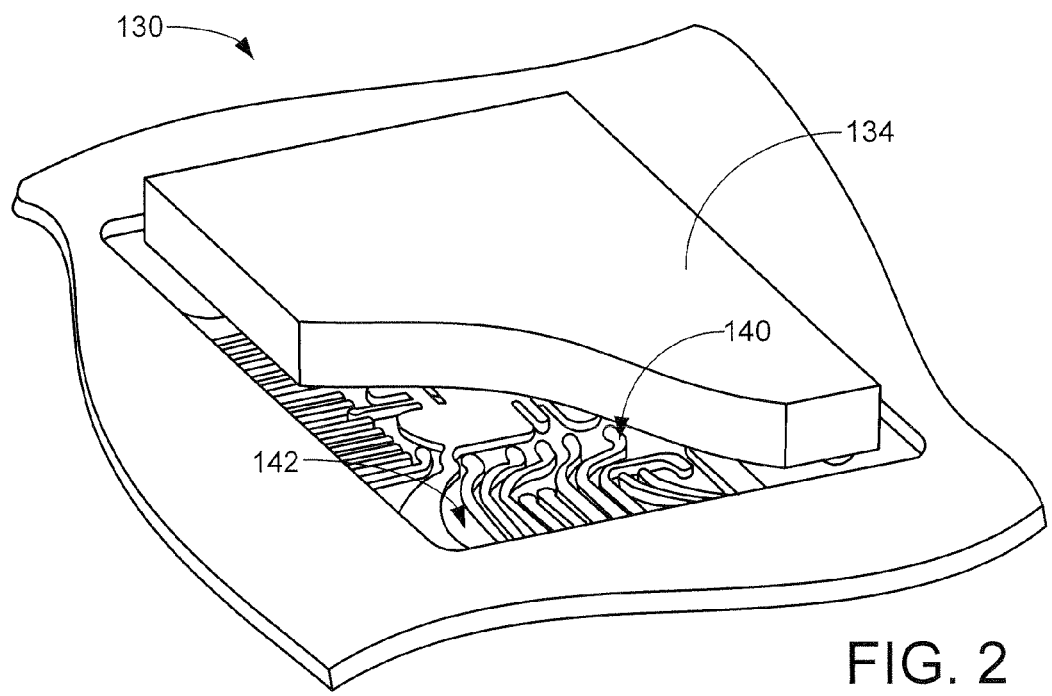
FIG. 2 is an isometric, partially cutaway view of the preamplifier of the data storage device of FIG. 1 and a portion of the flexible circuit.

FIG. 2 shows a portion of the printed structure 130 in greater detail. The structure 130 includes a heat generating integrated circuit (in this case a preamplifier, or "preamp") 134, shown in partial cut-away. As further shown in the simplified schematic depiction of FIG. 3, the preamp 134 is electrically coupled via a plurality of electrically conductive paths (traces) 136 to other electrical components 138, such as pads of the printed structure 130 that connect to the flex cable 124 (FIG. 1). The traces 136 are further connected to pads (not separately shown) on the underside of the preamp 134. The traces 136 are formed of a suitable electrically conductive material, such as copper, and extend along elongated, insulative layer segments (land portions) 140 made of a suitable insulative material, such as a polyimide.

Figure 4:
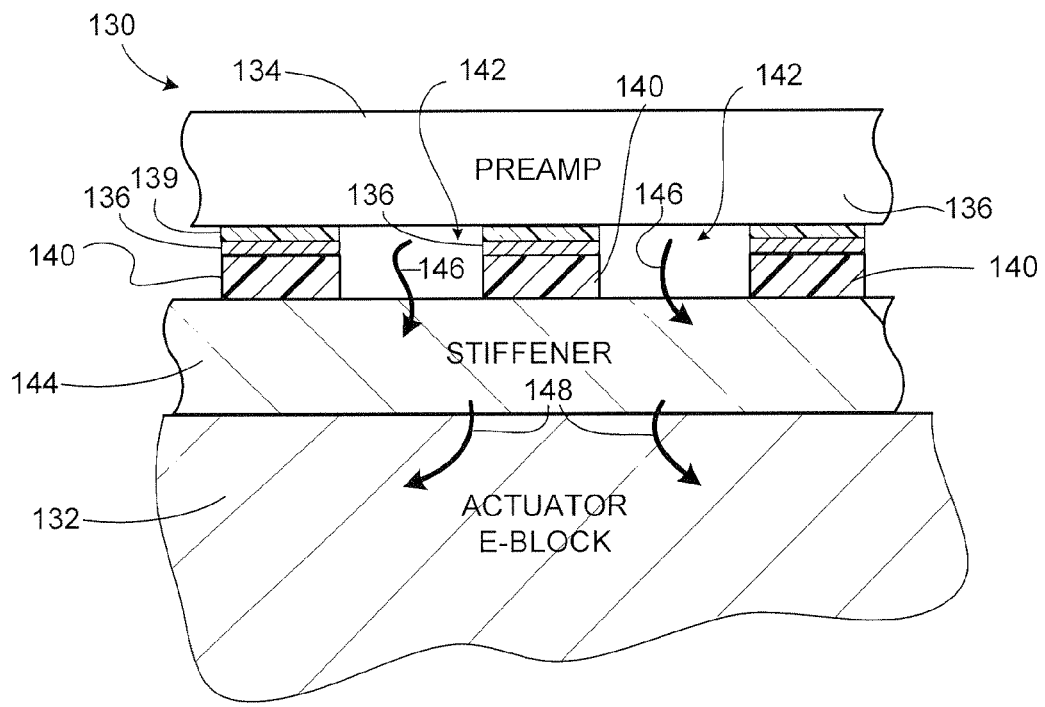
FIG. 4 is a top plan view of a portion of the flexible circuit of FIG. 1 showing the pad upon which the preamplifier is supported and showing a preferred embodiment of the present invention.

As further shown in FIG. 4, separation channels 142 extend between adjacent pairs of the land portions 140 from the preamp 134 to an underlying stiffener 144. The stiffener 144 preferably comprises a rigid, electrically and thermally conductive layer, such as aluminum, and is in turn attached directly to the E-block 132 (FIG. 1). The aforementioned land portions 140 are supported on the stiffener layer 144, as shown.

In this way, the separation channels 142 facilitate the formation of an efficient thermal energy transfer path; thermal energy generated via operation of the preamp 134 is readily transferred through the separation channels 142 to the stiffener 144. As desired, additional thin layers of insulative material 139 can be disposed over the traces 136 on each land portion 140 to electrically insulate the traces 136 from the preamp 134. The insulative layers 139 are not present in the vicinity of the pads used to connect the preamp 134 to the traces 136.

In some embodiments, the separation channels 142 will be filled with a suitable fluid, such as a portion of the atmosphere of the sealed environment of the data storage device 100, which can be air, a low density inert gas such as Helium, etc. Since the separation channels 142 expose the bottom of the preamp chip 134 directly to the stiffener 144, heat generated by the preamp 134 has unblocked access to the stiffener 144, as depicted by the radiant arrows 146, and is conducted to the actuator E-block 132, as depicted by the conduction arrows 148.

Figure 3:
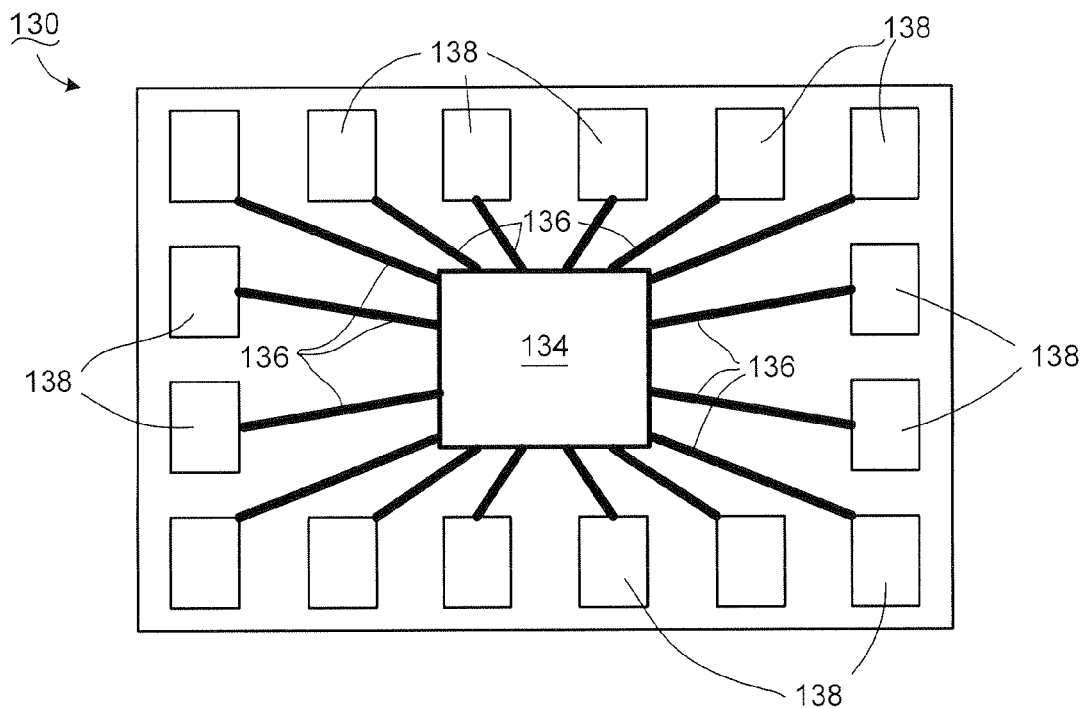
FIG. 3 is a diagrammatical representation of the flexible circuit of FIG. 1 showing the pad upon which the preamplifier is supported and showing the application of the present invention.

Preferably, as depicted in FIG. 3, the fluid in the separation channels 142 will be in fluidic communication with remaining portions of the interior of the device 100 and will thus flow through the separation channels 142 in response to rotation of a rotatable member adjacent the flex circuit assembly, such as the media 110 or actuator 114 (FIG. 1). This forced flow of fluid will generally tend to further increase the transfer of heat from the preamp 134 to the stiffener 148.

In practice, the insulation layer of the land portions 140 is preferably an organic layer of polyimide and adhesives. In one method of production, the insulation layer segments are formed via etching, eroding or removing the portions of the insulation layer that exist between and beneath the electrically conductive paths 136 to expose the metallic stiffener layer 144.

Figure 5:
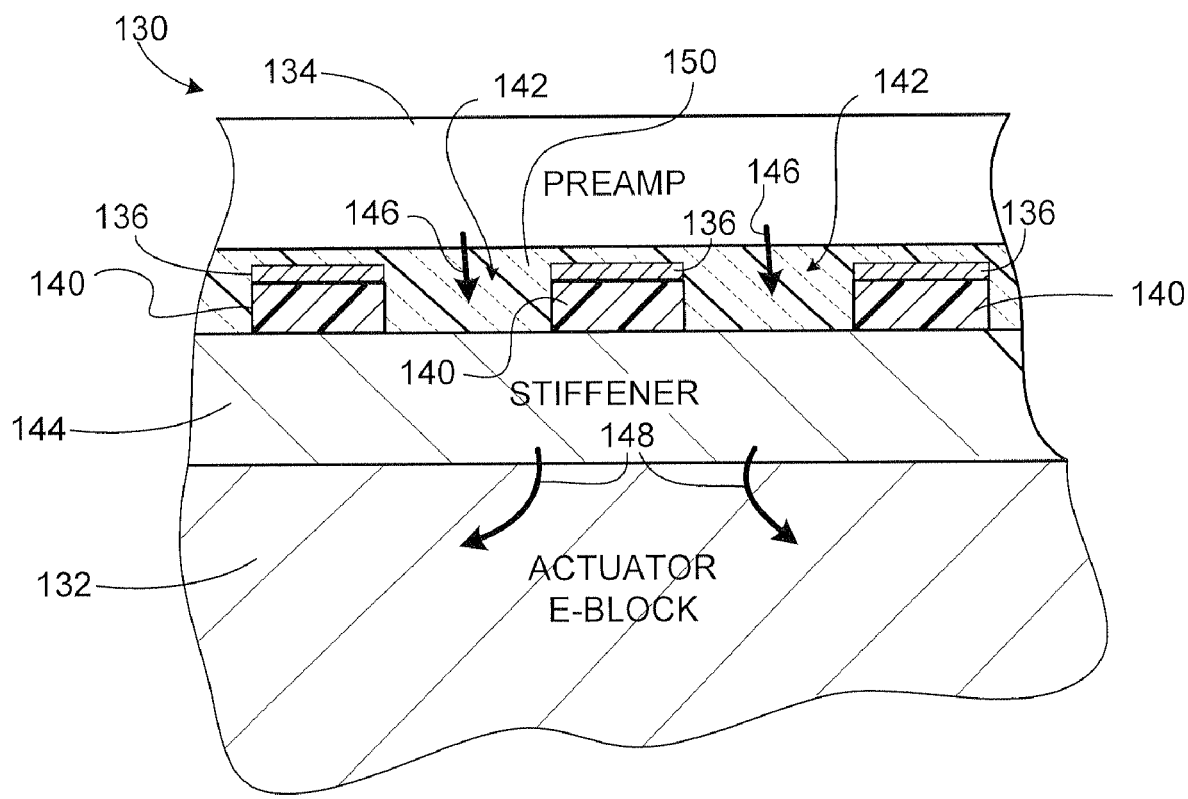
FIG. 5 is a top plan view of a portion of the flexible circuit of FIG. 1 showing the pad upon which the preamplifier is supported and showing another preferred embodiment of the present invention.

FIG. 5 generally illustrates another embodiment for the printed structure 130. In FIG. 5, the preamp 134 is connected to the electrically conductive paths 136 which extend along insulative land portions 140 as before. However, the separation channels 142 in FIG. 5 are filled with a solid heat conducting material 150. Since the separation channels 142 expose the bottom of the preamp 134 to the heat conducting material 150, heat generated by the preamp 134 will be rapidly conducted to the stiffener layer 144, as depicted by the conduction arrows 146, and in turn conducted to the actuator E-block 132, as depicted by the conduction arrows 148.

The presence of the heat conducting material 150 in the separation channels 142, and preferably between the electrically conductive paths 136 and the preamp 134 (except at the connection junctions), provides for improved heat transference from the preamp chip 134 to the E-block 132, effecting superior cooling of the operational temperature of the preamp.

Since the heat conducting material 150 also preferably serves to electrically isolate the conductive paths 136, the heat conducting material is preferably a suitable dielectric, heat conducting resin. Generally, any heat conducting material that can run or be wicked into the channels created by the separation channels 142 may be suitable to achieve the heat conducting operation described herein. Depending on production requirements and resin properties, resin curing could be oven-cured or ambient age curing, or both, but since room or oven curing are typical industry practices, no special processing will be required. And since the heat conducting material 150 fills the separation channels 142 between the electrically conducting paths 136 and the preamp chip 134, sideways conduction effects will distribute the heat such that it can readily move down to the E-block 132 along the most efficient path.

As before, the insulation layer 140, typically an organic layer of polyimide and adhesives, is selectively removed between electrically conductive paths 136 to expose the metallic stiffener layer 144, after which the dielectric, heat conducting material 150 is added to fill the separation channels 142 between adjacent lands.

It is contemplated that some thermal energy will pass directly to the ambient atmosphere from the top of the preamp 134, but most of the generated thermal energy will pass through the separation channels 142 (by way of the fluid in FIG. 4 or material 150 in FIG. 5) to the stiffener 144, into the E-block 132 and then to the surrounding atmosphere of the data storage deice 100 by virtue of the large surface area of the E-block 132.

The atmosphere of the data storage device 100 (whether air or an inert gaseous fluid such as helium) is a circulating medium that serves to distribute the heat more or less evenly, as aided by the spinning of the storage media discs 110, especially with the location of the E-block 132 being located directly in the path of circulation, with its extending arms acting like cooling fins between the discs. The device 100 can further be specifically configured to locate the preamp in the path of the air or helium coming directly off the spinning storage media, thereby further increasing the fluidic flow through the printed structure 130 and further increasing the heat transference rates.

It will now be appreciated that the various embodiments presented herein provide a new and improved method of moving thermal energy from an integrated circuit, into a heat sink structure (in this case from the preamp 134 to the stiffener 144 and E-block 132), and effectively improves the overall heat flow path from the integrated circuit to the surrounding atmosphere.

The formation of separation channels 142 down to the underlying conductive stiffener layer through the removal of the intervening organic insulation layer (that otherwise often surrounds the electrically conductive paths in prior designs) greatly enhances the heat transference rate. It has been found that a significant amount of insulating material between copper traces, or land portions, can be removed in many areas without impacting the electronic integrity of the integrated circuit.

Indeed, with the exception of the juncture connectors to the preamp, insulative material can be substantially removed from all areas adjacent and beneath the preamp not covered by metal. Once uncovered by the insulating layer, the resulting channels form "superhighways" for the passage of heat.

Tests conducted on data storage devices (such as 100) have shown that thermal impedance reductions of as much as 10-20 degrees C/Watt are possible due to the lowering of the operating temperature of the preamp in this way.

While the various embodiments presented herein are generally provided in the context of a data storage device, it will be appreciated that this is merely for purposes of illustration and is not limiting. Rather, the exemplary printed circuit assembly as disclosed herein can be readily used in any number of other environments as desired.

It will be clear that the various embodiments presented herein are well adapted to carry out the objects and attain the ends and advantages mentioned as well as those inherent therein. While presently preferred embodiments have been described for purposes of this disclosure, numerous changes may be made that will readily suggest themselves to those skilled in the art and that are encompassed in the spirit of the invention disclosed and as defined in the appended claims.

What is claimed is:

1. An apparatus comprising a flex circuit assembly with a printed structure comprising a plurality of adjacent land portions formed on a heat conductive stiffener member and which support electrically conductive paths for connection to an integrated circuit, each said land portion comprising an elongated extension of insulation material disposed on the stiffener member and an elongated electrical land disposed on and having nominally identical length and width dimensions as the elongated extension of insulation material, wherein separation channels between the adjacent land portions direct thermal energy generated by operation of the integrated circuit to the stiffener member.

2. The apparatus of claim 1, wherein the stiffener member is supported by an E-block which operates as a heat sink for said thermal energy conducted to the stiffener member.

3. The apparatus of claim 2, wherein the E-block supports a data transducer adjacent a storage medium, and wherein the integrated circuit comprises a preamplifier circuit which preamplifies readback signals transduced by the data transducer.

4. The apparatus of claim 1, wherein the integrated circuit comprises an integrated circuit die encapsulated within an electrically insulation housing, and the housing supports a plurality of electrically conductive pads, each pad contacting a selected land portion from said plurality of land portions.

5. The apparatus of claim 1, wherein the stiffener member is characterized as a substantially planar, thermally conductive and mechanically rigid material.

6. The apparatus of claim 5, wherein said material comprises aluminum.

7. The apparatus of claim 1, wherein the insulation material comprises a polyimide.

8. The apparatus of claim 1, wherein the electrically conductive paths comprise copper.

9. The apparatus of claim 1, wherein the separation channels fluidically communicate with the stiffener member to transfer thermal energy from the integrated circuit to the stiffener member.

10. The apparatus of claim 1, wherein a dielectric, heat conducting material is disposed in the separation channels to conduct thermal energy from the integrated circuit to the stiffener member.

11. The apparatus of claim 1, wherein the separation channels are filled with a fluid which flows through said separation channels responsive to rotation of a rotatable member adjacent the flex circuit assembly.

12. An apparatus comprising a flex circuit assembly characterized as a printed structure comprising:
   a plurality of adjacent land portions formed on a heat conductive stiffener member and which support electrically conductive paths for connection to an integrated circuit, each land portion extending from the stiffener member a selected distance and formed of an elongated extension of insulation material;
   a corresponding plurality of separation channels between the adjacent land portions, each separation channel bounded by an opposing pair of said land portions and the stiffener member; and
   first means for transferring thermal energy generated by operation of the integrated circuit through the separation channels and to the stiffener member.

13. The apparatus of claim 12, wherein the first means comprises a fluid which flows through said separation channels responsive to rotation of a rotatable member adjacent the flex circuit assembly.

14. The apparatus of claim 13, wherein the fluid comprises air.

15. The apparatus of claim 13, wherein the fluid comprises a low-density inert gas.

16. The apparatus of claim 12, wherein the first means comprises a dielectric, heat conducting material which fills the separation channels to conduct thermal energy from the integrated circuit to the stiffener member.

17. The apparatus of claim 12, wherein the stiffener member is supported by an E-block which operates as a heat sink for said thermal energy conducted to the stiffener member.

18. A flex circuit assembly comprising:
   a plurality of discrete land portions formed on a heat conductive stiffener member and which support electrically conductive paths for connection to an integrated circuit, each land portion extending from the stiffener member a selected distance and formed of an elongated extension of insulation material; and
   a corresponding plurality of separation channels between the adjacent land portions adapted to transfer thermal energy generated by operation of the integrated circuit, each separation channel bounded by at least one of said land portions and the stiffener member.

19. The flex circuit assembly of claim 18, in which the separation channels are in fluidic communication with an atmospheric environment surrounding the integrated circuit so that fluidic currents of said atmospheric environment flow into the separation channels to conduct thermal energy to the stiffener member.

20. The flex circuit assembly of claim 18, in which a dielectric, heat conducting material fills the separation channels to conduct thermal energy from the integrated circuit to the stiffener member.

* * * * *